Nov. 19, 1968  J. P. KOHLS  3,411,603
CONTROL FOR SELF-GUIDED VEHICLE
Filed July 20, 1966  3 Sheets-Sheet 2
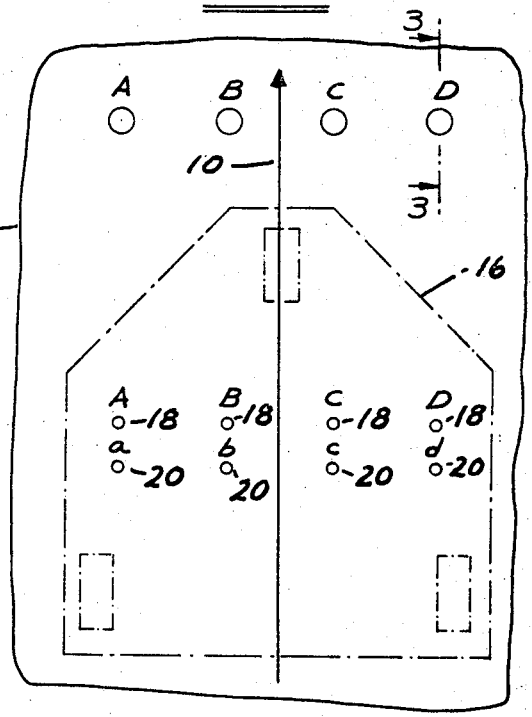
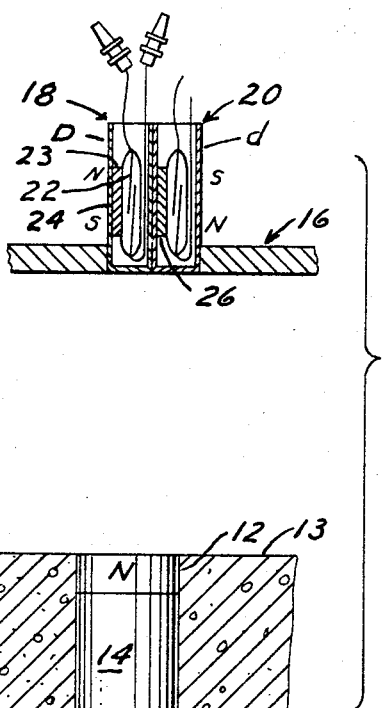
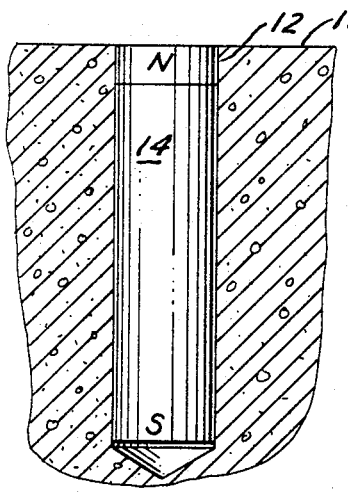
INVENTOR
JAMES, P. KOHLS
BY
*Farley, Forster & Farley*
ATTORNEYS

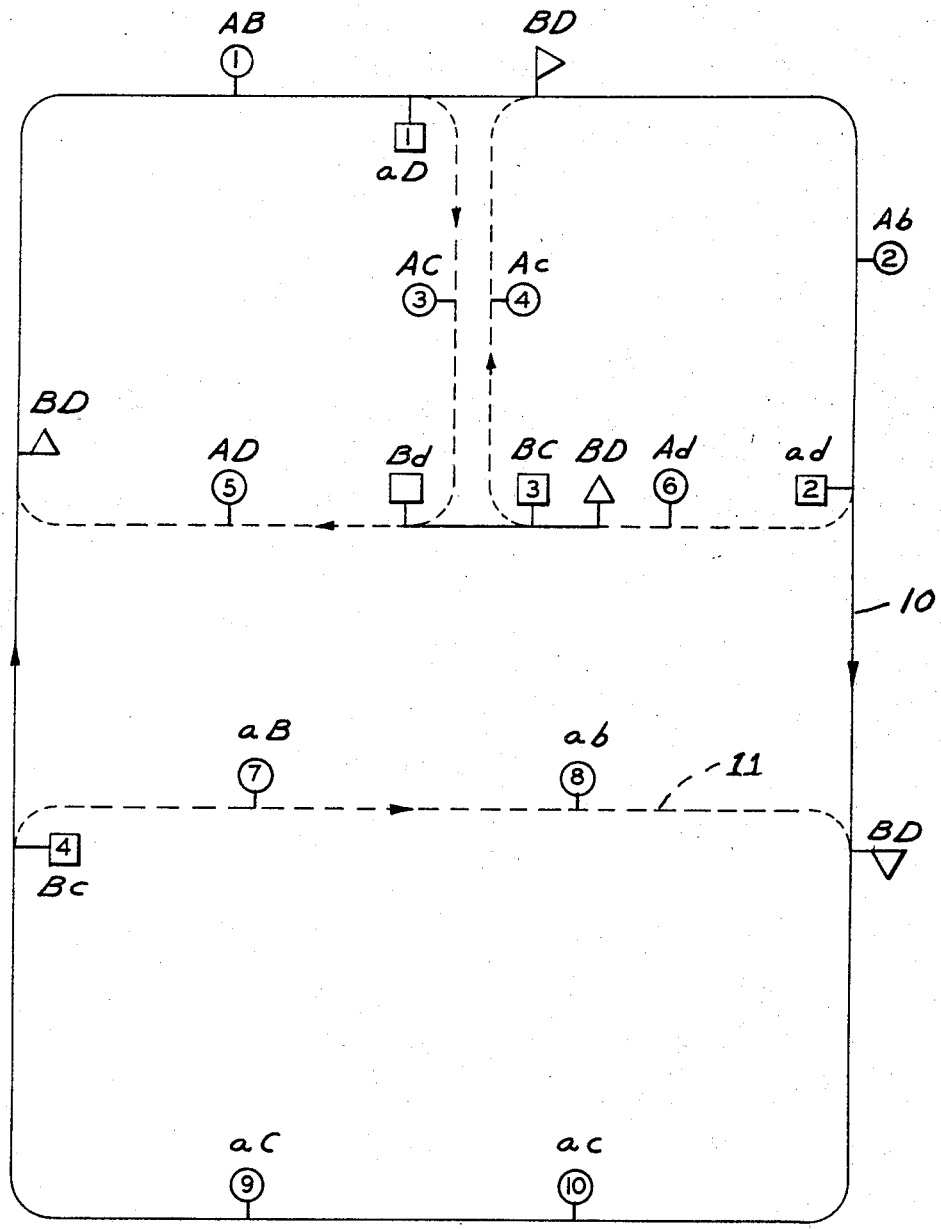

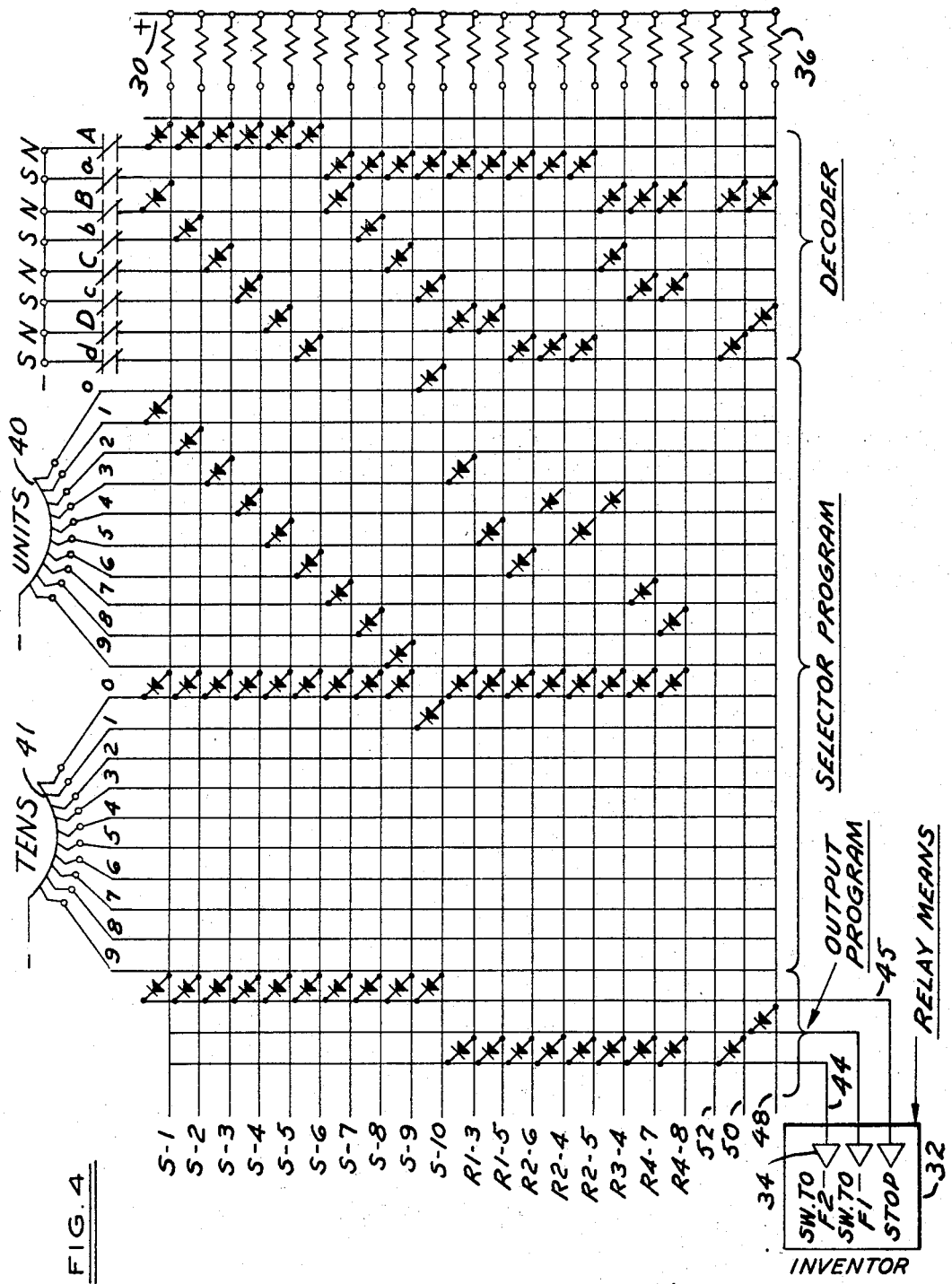

United States Patent Office 3,411,603
Patented Nov. 19, 1968

3,411,603
CONTROL FOR SELF-GUIDED VEHICLE
James P. Kohls, Detroit, Mich., assignor to Jervis B.
Webb Company, a corporation of Michigan
Filed July 20, 1966, Ser. No. 566,571
17 Claims. (Cl. 180—98)

ABSTRACT OF THE DISCLOSURE

A control for causing a self-guided vehicle to perform selected functions at locations along a guide path route network. Each location is coded by a plurality of permanent magnets mounted adjacent the guide path in a pattern, and magnetic sensitive circuit controlling devices are mounted on the vehicle in each position of the pattern. The circuit controlling devices for each code are connected to corresponding code lines of a matrix type circuit together with programmed connections to the code lines from selector switch means on the vehicle. Each code line is connected to a relay controlling the function to be performed as the vehicle passes the location identified by the code of such line, a circuit to the relay being completed in response to the combination of the information given by the circuit controlling devices and the information from the selector switch means.

---

This invention relates to an improved control for a self-propelled, self-guided vehicle of the type capable of following a route path defined by an energized guide wire on the surface over which the vehicle travels.

Vehicles of this type are used in industry, for example, in warehouses, to pull a train of carts around a route network defined by installing the guide wire on the warehouse floor. The route network may include a number of stations to which the vehicle can be dispatched, and may include a number of route junctions at which the vehicle may switch from the path defined by a guide wire energized at one frequency to an alternate path defined by another guide wire energized at a different frequency. In addition to the stopping and switching functions, the vehicle may also automatically perform other functions at certain locations along the route network, for example, change its speed. U.S. Patent 3,147,817 discloses one form of control for an installation of this type which functions on a sequential or counting principle.

Any installation of this type must be programmed, that is, when the installation is planned the vehicle functions and routing must be analyzed and a program established for the control of vehicle functions in travelling from one station to another on the route network. This program is then built into the control, and if for any reason the program has to be changed, corresponding changes necessary in the control, especially one of the sequential type, can be relatively expensive and time consuming.

The object of the present invention is to provide a control enabling a self-guided vehicle to proceed from one destination to another selected destination along a route network, to perform any other function desired at a certain location or locations, select alternate route paths if required in accordance with a predetermined program, and which offers a high degree of simplicity in the installation of the route network and programming of the control.

A further object is to provide a control which permits program changes with relative ease and low cost.

Another object is to provide a control of this type which can be standardized in construction to a relatively great extent, instead of being completely custom built for each installation and program required therein.

In general, the control provided by the invention for enabling a self-propelled, self-guided vehicle adapted to follow a route network, causing the vehicle to perform certain functions at certain locations along the route network, comprises the combination of signal means at each location arranged in a code indicative of such location, these locations including stations to which the vehicle may be dispatched and points such as route junctions where the vehicle may switch to an alternate guide path frequency; sensing devices on the vehicle arranged to read the signal means; an electrically actuable device on the vehicle for initiating each of the desired functions; and, a combination logic circuit on the vehicle including a decoder section connecting the sensing devices to a code line for each code, a selector section having selector switch means and programmed connections to the code lines, and an output programming section establishing required connections between the code lines and an input signal line to each of the electrically actuable means for initiating any function required to enable the vehicle to proceed from one station along a desired route to another station and stop.

Other features and advantages of the invention will become apparent from the following description of the representative embodiment shown in the accompanying drawings in which:

FIGURE 1 is a schematic layout of a representative route network;

FIGURE 2 is a schematic plan view illustrating the relation between a spatial code pattern for the signal means and for the code sensing devices on the vehicle;

FIGURE 3 is an enlarged sectional elevation taken as indicated by the line 3—3 of FIG. 2 showing the relation between one signal device and the sensing means on the vehicle; and FIGURE 4 is a schematic diagram of a combination logic circuit.

The route network schematically illustrated in FIG. 1 includes a number of intersecting paths all defined by a guide wire laid on or in the floor or supporting surface over which a self-propelled vehicle is to travel and be guided thereby. The guide wire 10 for those portions of the network shown in solid line is energized at one frequency, and the guide wire 11 for those portions of the network shown in broken line is energized at a different frequency. Frequency 1 shown in solid line may for example be 10 kHz. and frequency 2 shown in broken line may be 6.5 kHz. The encircled locations around the network numbered 1 through 10 represent stations to which the vehicle may be dispatched and will stop upon arrival. The forward direction of vehicle travel along the various routes is indicated by arrows. At the junction locations designated by a square and numbered 1 through 4, the vehicle may switch from sensing the guide path energized at frequency No. 1 to the guide path energized at frequency No. 2 and, at the junction locations designated by a triangle, a vehicle returning to the frequency 1 guide path from a frequency 2 guide path will switch from sensing the latter guide path to the former.

These three functions to be performed by the vehicle at the various locations, namely, stop, switch to frequency 2, or switch to frequency 1 are initiated by any suitable electrically operable equipment mounted on the vehicle such as an amplifier or relay driver and relay for each function. Since such equipment is well-known it has not been shown in detail but its relation to the control is illustrated and will be explained in connection with FIG. 4.

Signal means is provided at each location on the route network at which the vehicle may perform one of the functions, and in the preferred construction shown the signal means comprises two permanent magnets at each location. Each of these permanent magnets is mounted in one of positions A, B, C or D of a spatial pattern illustrated in FIG. 2 in a code determined by the relative position of the two magnets in the pattern and by their polarity. The permanent magnets are of the bar type and each magnet is mounted at a location simply by forming a hole 12 in the supporting surface 13 as illustrated by the magnet 14 in FIG. 3. The magnet is inserted in the hole with either its north or south pole adjacent the supporting surface.

FIG. 1 shows the code for each location on the route network. A capital letter A, B, C or D indicates that the permanent magnet is mounted in that respective position of the spatial pattern with the north pole of the magnet adjacent the supporting surface 13; a small letter $a$, $b$, $c$, or $d$ indicates that the magnet is mounted in that position of the spatial pattern with its south pole adjacent the supporting surface 13. Thus station 1 is identified by the code A, B designating a permanent magnet in each of positions A and B with the north pole of each magnet adjacent the supporting surface; station 2 is identified by the code formed by a north polarity in position A and a south polarity in position B.

Referring to FIG. 2, a self-propelled three-wheeled vehicle 16 provided with well-known means (not shown) for following the guide wire, is equipped with sensing devices arranged to read the signal means. Preferably these sensing devices each consist of a pair of biased reed switches 18 and 20 mounted on the vehicle in each position of the spatial code pattern. One pair of switches is illustrated in FIG. 3. Switch 18 consists of encapsulated switch contacts 22 and a biasing magnet 23 mounted in a housing 24. The biasing magnet 23 holds the switch contacts 22 in a normally closed position except when opposed by a north code magnet 14 which causes the switch contacts to open. Switch 20 is similar in construction except that its biasing magnet 26 is oppositely arranged in polarity so as to be opposed by a code magnet of south polarity.

Hence the switch 18 in FIG. 3 has also been designated as the "D" sensing device and its switch contacts will open every time it passes over a north polarity code magnet in position D in the floor. Likewise, switch 20 in FIG. 3 has been designated "$d$." Its switch contacts will open every time a south polarity magnet in position $d$ is passed. Anytime either sensing device passes over a code magnet of the opposite polarity to which the reed switch is biased, the magnetic field of the code magnet augments the magnetic field of the biasing magnet and the only effect is to force the switch contacts 22 more tightly closed.

FIG. 4 illustrates a circuit for selectively connecting a positive voltage in line 30 at the right of the diagram to the relay means 32 at the left, the relay means including a relay driver 34 for each of the three functions to be performed by the vehicle namely, switch to frequency 2, switch to frequency 1, and stop. This circuit includes a number of horizontal lines each connected to the positive line 30 through a resistance 36. These horizontal lines will be termed "code lines." They are designated at the left S-1 through S-10 denoting the stations 1-10, and R1-3, R1-5, etc., designating route, station 1-3; route, station 1-5; etc.

The diode matrix circuit may be broken down into three sections, a decoder section, a selector program section, and an output program section. In the decoder section, the code lines are suitably connected by diodes to vertical lines each of which leads through the normally closed contacts of one of the sensing switches to ground. For example, the first horizontal code line labeled "S-1" is connected by diodes to the vertical lines leading to the A and B sensing switches, which as shown in FIG. 1 is the code for station 1. In other words, in the decoder section each code line is connected to the sensing devices which establish or recognize the code for which the code line is used. For a given code arrangement, the design and construction of the decoder section may be standardized if desired.

The selector program section of the circuit adds the information or logic obtained from the setting of selector switch means 40 and 41 mounted on the vehicle. The switches 40 and 41 shown are arranged in decimal fashion, one switch 40 being used for units and the second switch 41 for tens to give a possible selection of zero to 99. The contacts of each of the switches 40 and 41 are normally closed and each is connected by diodes to the code line for the station designated by the contact. For example, the first horizontal code line labeled "S-1" is connected by a diode to contact No. 1 of the unit switch 40 and by a diode to the zero contact of the ten switch 41.

Programmed connections are also established from the selector switches to the code lines used for route control. For example, the code line designated "R1-3" which is established by the decoder section as the line for code $a$D is connected in the selector program section by a diode to the switch contact No. 3 for station 3. Referring to FIG. 1, it will be seen that if a vehicle at station No. 1 is dispatched to station No. 3, route junction No. 1 identified by the code $a$D is passed and at that junction the vehicle must switch to frequency No. 2 in order to reach station 3.

The frequency switching and other functions are controlled by the output program section of the circuit which incorporates connections from the code lines to the relay means for initiating any function required to enable the vehicle to traverse the desired route from one station to another station and stop at the latter station. All connections off any code line to the sensing and selector switches must be open before an output signal will flow from the output program section.

A few examples will further illustrate the operation of the control. If a vehicle is at station No. 1 and is to be dispatched to station No. 3, the units switch 40 is set to position 3, and the ten switch 41 to position zero. Referring to FIG. 4 and following the vertical line from contact 3 of switch 40 through the matrix, the diode connections show that the code lines for station No. 3 and for route 1-3 are no longer grounded through the selector switches. The vehicle is started and when it reaches route junction No. 1 the $a$D sensing switches open and a circuit is completed through the route 1-3 code line to the input line 44 for the relay driver 34 controlling the switch to frequency No. 2 function. Consequently the vehicle switches to the frequency 2 or dotted path in FIG. 1 and turns right at the junction. At station No. 3 the AC sensing switches open and a circuit is completed through the station 3 code line of the matrix to line 45, giving an input signal to the relay driver for the stop function.

If the vehicle is next to proceed from station 3 to station 4, the units selector switch 40 is set to position 4 which contact has connections through the matrix to the code lines for route 2-6 and route 3-4. The route 2-4 code line is connected to the $ad$ sensing switches which establish the code for junction No. 2, FIG. 1; and the route 3-4 code line has connections to the BC sensing switches for junction No. 3. In proceeding from junction 2 to junction 3, the vehicle must be switched back to frequency No. 1 at the location identified by the code BD in FIG. 1. This is a constant function which must be performed by every passing vehicle in order that it will be in a position to make a selection at junction 3, and this function is taken care of in the circuit by the last code line 48 at the bottom of the diagram. Any vehicle which is not programmed to turn right at junction 3 must be switched back to frequency No. 2 at the location indicated by the code B$d$, and this function is taken care of by the code line 50 of the circuit.

The circuit of FIG. 4 combines the logic received from the sensing devices and the logic received from the selector switches and the logic of alternate route selection established by the programming of the selector switches into the commands necessary to enable the vehicle to perform any function required in order to traverse the desired route from one station to another. If for any reason the operation of the vehicle in proceeding from one station to another destination is interrupted—for example, if the vehicle is manually driven off the guide path and returned to it, the operation of the control will not be affected, even if the vehicle is returned to a different point on the guide path. Likewise the setting of the selector switches can be changed at anytime without affecting the operation of the control other than to set up a different command to the vehicle. Hence the control is very flexible in operation.

The control is also very flexible in the sense that a change in programming can be made simply by changing the diode connections in the matrix or by adding diode connections, and if necessary other relay means. For example, in FIG. 4 the third code line 52 from the bottom is vacant. This and other additional code combinations available from the combination of coding magnets employed could be used to enable the vehicle to perform additional functions, such as change speed, blow horn, etc.

It is also relatively easy to change the coding of various locations along the route network, simply by alternating the position or relative polarity of the permanent magnets. This flexibility, or the ease with which changes can be made, is of great importance. The necessity for such changes is frequently encountered when an installation is first put into operation.

It is contemplated that the various sections of the combination logic circuit would be fabricated as separate units which plug into each other. This enables the construction of these sections to be standardized to the greatest possible extent for production economies, and also enables the programming of vehicles to be readily changed in the field. Such changes may be required for a variety of reasons, such as moving vehicles from one route network to another route network which is part of the same installation, or moving vehicles from one installation to another.

I claim:

1. A control for a self-guided vehicle adapted to follow a route network for causing the vehicle to perform certain functions at certain locations along the route network comprising:
   (a) signal means at each location arranged in a code indicative of such location;
   (b) a plurality of sensing devices on the vehicle arranged to simultaneously read the code of the signal means; each sensing device having a circuit controlling means responsive to one of the signal means;
   (c) selector switch means on the vehicle having settings indicating vehicle destination location on the route network; and
   (d) a combination logic circuit on the vehicle including a voltage source, at least one code line for each code, an output programming section having connections from the code lines to relay means for initiating the functions coded by the code lines, and means for completing circuits from the voltage source through the code lines to the relay means in response to the combination of the information given by the sensing devices and the information given by the setting of the selector switch means, including a decoder section having connections between each code line and each sensing device which identifies the code of such line and a selector section having programmed connections between the code lines and the selector switch means.

2. A control as claimed in claim 1, wherein the signal means comprises a plurality of permanent magnets mounted in the surface over which the vehicle travels at each location along the route.

3. A control as claimed in claim 1, wherein the signal means comprises a plurality of permanent magnets, each code being determined by the polarity of at least two magnets and their relative position in a spatial pattern, and wherein the sensing devices on the vehicle are magnetic polarity sensitive and are arranged in the same spatial pattern.

4. A control as claimed in claim 1, wherein the signal means at each location consists of a plurality of permanent bar-type magnets, and a hole in the vehicle supporting surface in which each magnet may be mounted with one pole thereof adjacent the plane of the supporting surface.

5. A control as claimed in claim 4 wherein each of the sensing devices on the vehicle is magnetically sensitive and biased to one magnetic polarity.

6. A control as claimed in claim 5 wherein each code is also determined by the relative position and polarity of the plurality of magnets in a spatial pattern, and wherein the sensing devices on the vehicle are arranged in a corresponding spatial pattern and are sensitive to the polarity of a coding magnet adjacent each position of said pattern.

7. A control as claimed in claim 1 wherein the signal means at each location comprises a plurality of permanent magnets mounted in a pattern in the surface over which the vehicle travels in a code determined by the polarity of said permanent magnets, and wherein the sensing devices on the vehicle consist of a pair of reed switches mounted on the vehicle in each position of the pattern, and means magnetically biasing the reed switches to normally closed position for movement of one reed switch to open position in the presence of a permanent magnet of north polarity and movement of the other reed switch of the pair to open position in the presence of a permanent magnet of south polarity.

8. A control as claimed in claim 1 wherein the decoder section of the combination logic circuit is a matrix standardized by the number of sensing devices and the number of code lines.

9. A control as claimed in claim 1 wherein the selector section of the combination logic circuit is a matrix the characteristics of which are standardized by the number of code lines in the decoder section of the circuit and by the number of contacts of the selector switch means.

10. A control as claimed in claim 9 wherein the code lines from the decoder section of the circuit identify station locations and route junction locations on the route network, the selector section matrix including connections from a station code line to a contact of the selector switch means for such station and a programmed connection from such switch contact to the code line for any route junction at which the vehicle must switch to an alternate route in travelling to such station.

11. A control as claimed in claim 9 wherein the code lines of the selector section matrix are normally gorunded through the contacts of the selector switch means.

12. A control as claimed in cliam 1 wherein the output section of the combination logic circuit is a matrix whose characteristics are standardized by the number of code lines utilized in a particular route network and the number of control functions actuated by the relay means.

13. A control as claimed in claim 1 wherein the decoder, selector, and programming sections of the combination logic circuit are separate matrices the code lines of which are connectable together.

14. In a control for a self-guided vehicle adapted to follow a route network for causing the vehicle to perform certain functions at certain locations along the route network, means for identifying each location comprising a plurality of permanent magnets mounted in a pattern at each location in the surface over which the vehicle travels in a code determined by the polarity of said magnets, and a pair of opposite polarity sensitive devices mounted on the vehicle in each position of the pattern.

15. A control as claimed in claim 14 wherein the polarity sensitive devices comprises a pair of reed switches, and means magnetically biasing one reed switch of the pair for response to a north polarity permanent magnet and biasing the other reed switch of the pair for response to a south polarity permanent magnet.

16. A control as claimed in claim 1 wherein the code lines are connected to one side of said voltage source, and the other side of said voltage source is connected to the code lines through the circuit controlling means of the sensing devices.

17. In a route network for a self-guided vehicle including stations to which the vehicle may be dispatched and route junctions between alternate paths of vehicle travel, a control for the function to be performed by the vehicle at each station and route junction comprising:
   (a) a plurality of signal means at each station and route junction arranged in a code indicative thereof;
   (b) a combination logic circuit on the vehicle including a code line for each station and for each route between any two stations requiring a change of function at a junction along such route;
   (c) relay means connected to each code line for initiating the function coded thereby;
   (d) a voltage source; and
   (e) means for completing circuits from the voltage source through the code lines to the relay means including a plurality of sensing devices on the vehicle arranged to simultaneously read the code of the signal means, a connection between each code line and each sensing device which identifies the code of such line, and station selector switch means with programmed connections to the code lines.

References Cited

UNITED STATES PATENTS

| 2,900,497 | 8/1959 | Sande | 246—2 |
| 3,074,353 | 1/1963 | Devonshire et al. | 104—88 |
| 3,117,754 | 1/1964 | Morganstern | 104—88X |
| 3,147,817 | 9/1964 | De Liban | 180—98 |
| 3,158,710 | 11/1964 | Paglee | 104—88X |
| 3,168,268 | 2/1965 | Bossart et al. | 104—88X |
| 3,245,493 | 4/1966 | Barrett | 180—98 |

KENNETH H. BETTS, *Primary Examiner.*